(12) United States Patent
Vann

(10) Patent No.: US 8,817,850 B2
(45) Date of Patent: Aug. 26, 2014

(54) SYSTEMS AND METHODS FOR TRANSCEIVER COMMUNICATION

(75) Inventor: Emerick Vann, Dublin, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

(21) Appl. No.: 13/442,808

(22) Filed: Apr. 9, 2012

(65) Prior Publication Data

US 2012/0314737 A1  Dec. 13, 2012

Related U.S. Application Data

(60) Provisional application No. 61/473,631, filed on Apr. 8, 2011.

(51) Int. Cl.
*H04B 1/38* (2006.01)

(52) U.S. Cl.
USPC .................................. 375/219; 455/73; 710/1

(58) Field of Classification Search
USPC ........................................................ 375/219
See application file for complete search history.

(56) References Cited

U.S. PATENT DOCUMENTS

| | | | |
|---|---|---|---|
| 6,704,317 B1 | 3/2004 | Dobson | |
| 6,868,072 B1* | 3/2005 | Lin et al. | 370/276 |
| 7,835,379 B2* | 11/2010 | Dravida et al. | 370/419 |
| 7,881,755 B1* | 2/2011 | Mishra et al. | 455/574 |
| 8,023,557 B2* | 9/2011 | Constantinidis et al. | 375/219 |
| 8,027,376 B2* | 9/2011 | Yamanaka et al. | 375/219 |
| 8,184,681 B2* | 5/2012 | Binder et al. | 375/219 |
| 8,488,655 B2* | 7/2013 | Batra et al. | 375/219 |
| 8,514,915 B2* | 8/2013 | Binder et al. | 375/219 |
| 2003/0053493 A1 | 3/2003 | Graham Mobley et al. | |
| 2004/0019876 A1* | 1/2004 | Dravida et al. | 717/117 |
| 2006/0097814 A1* | 5/2006 | Schlesinger et al. | 332/103 |
| 2006/0128324 A1* | 6/2006 | Tan et al. | 455/127.1 |
| 2010/0020746 A1* | 1/2010 | Zaks | 370/328 |
| 2011/0260839 A1* | 10/2011 | Cook et al. | 340/10.4 |

OTHER PUBLICATIONS

International Application No. PCT/US2012/032812, International Search Report and Written Opinion mailed Jul. 19, 2012.

* cited by examiner

*Primary Examiner* — Chieh Fan
*Assistant Examiner* — Santiago Garcia
(74) *Attorney, Agent, or Firm* — Sheppard, Mullin, Richter & Hampton LLP

(57) ABSTRACT

Systems and methods for transceiver communication are discussed herein. An exemplary system comprises a first transceiver and a second transceiver. The first transceiver may comprise an I/Q module and a PHY device. The I/Q module may receive a first complex signal and transform the first complex signal into bit words of a predetermined size and framewords. The PHY device may receive the bit words, transmit the bit words and framewords over a cable, and perform adaptive cancellation. The second transceiver may comprise a PHY device, an I/Q module, an I/Q modulator, and an antenna. The PHY device may receive the bit words and the framewords from over the cable. The I/Q module may transform the bit words to a second complex signal based on the framewords. The I/Q modulator may modulate the complex signal to generate a transmit signal. The antenna may transmit the signal.

31 Claims, 6 Drawing Sheets

SYSTEMS AND METHODS FOR TRANSCEIVER COMMUNICATION

CROSS-REFERENCE TO RELATED APPLICATIONS

The present application claims benefit of U.S. Provisional Patent Application No. 61/473,631 filed Apr. 8, 2011, and entitled "Systems and Methods for IDU Modem to ODU Interface Using 1 Gbps PHY Ethernet Communication" which is incorporated by reference herein.

BACKGROUND

1. Field of the Invention(s)

The present invention(s) generally relate to transceiver communications. More particularly, the invention(s) relate to systems and methods for transceiver communication over using PHY Ethernet communication.

2. Description of Related Art

In microwave radio systems, a transceiver may include an indoor unit (IDU) and an outdoor unit (ODU) coupled to an antenna. In one example, the IDU may be coupled to a server or other computer over a wired network (e.g., LAN, WAN, or the Internet). Information to be wirelessly transmitted may be prepared by both the IDU and the ODU before wireless transmission. Similarly, the outdoor unit may receive signals from the antenna to provide to the server or other computer via the IDU.

The IDU and the ODU have typically been coupled to each other over a coaxial cable. An intermediate frequency (IF) may be sent from the IDU to the ODU, for example, using frequency diversity to avoid colliding with signals being provided by the ODU to the IDU. In order to maintain the signals, complex filters are required by both the IDU and the ODU to separate out the different frequencies (e.g., 125 MHz from 311 MHz). Further, filters are required to reduce or eliminate triple transit influences caused by a mismatch of cables to filters or other components. As a result of triple transit influences, data propagated up the cable from the IDU to the ODU may bounce back to the IDU causing self interference which may degrade performance of the radio.

SUMMARY OF THE INVENTION

Systems and methods for transceiver communication are discussed herein. An exemplary system comprises a first transceiver and a second transceiver. The first transceiver may comprise an I/Q module and a PHY device. The I/Q module is configured to receive a first complex signal and to transform the first complex signal into bit words of a predetermined size and framewords. The PHY device is configured to receive the bit words of the predetermined size and framewords, transmit the bit words and framewords over at least one cable, and to perform adaptive cancellation based, at least in part, on the transmitted bit words and framewords to improve reception over the at least one cable by the PHY. The second transceiver may comprise a PHY device, an I/Q module, an I/Q modulator, and an antenna. The PHY device is configured to receive the bit words and the framewords from over the at least one cable. The I/Q module is configured to receive the bit words and the framewords from the PHY device of the second transceiver module and to transform the bit words to a second complex signal based, at least in part, on the framewords. The I/Q modulator is configured to modulate the complex signal to generate a transmit signal. The antenna configured to transmit the signal.

In various embodiments, the first transceiver module further comprises a modulator configured to receive a pretransmission signal and modulate the pretransmission signal to generate the first complex signal. The first transceiver module may further comprise a phase lock loop configured to provide a clock signal to the modulator. The clock signal may be at a speed that is slower than an operation of the PHY device of the first transceiver module to allow for addition of the framewords by the I/Q module of the first transceiver.

The bit words of the predetermined size may be 8 bit words. The predetermined size may be based on a largest size of bit words that the PHY device of the first transceiver module may transmit over the at least one cable.

In some embodiments, the I/Q module configured to transform the complex signal into bit words of the predetermined size and framewords comprises the I/Q module configured to transform the complex signal, which is a 12 bit stream, to 8 bit words and framewords. The I/Q module configured to transform the complex signal into bit words of the predetermined size and framewords may comprise the I/Q module configured to place 8 bits from an I component of the complex signal into a first 8 bit word, to place 4 bits from the I component and 4 bits from a Q component of the complex data into a second 8 bit word, and to place 8 bits from the Q component into a third 8 bit word. Further, the I/Q module may be further configured to add a frameword to the first 8 bit word and a frameword to the second 8 bit word.

In some embodiments, the at least one cable is a category five Ethernet cable. The second transceiver module may further comprise a waveguide filter and a waveguide module. The waveguide filter may be configured to filter the transmit signal. The waveguide module may be configured to provide the filtered, transmit signal from the waveguide filter to the antenna. The complex signal may be a QAM signal.

The PHY device of the first transceiver module is may be further configured to initialize a connection with the PHY device of the second transceiver module to determine an expectation of location of framewords.

Another exemplary system may comprise a first transceiver module and a second transceiver module. The first transceiver module may comprise an I/Q module and a PHY device. The I/Q module of the first transceiver module may be configured to receive a first complex signal and to transform the first complex signal into bit words of a predetermined size and framewords. The PHY device of the first transceiver module may be configured to receive the bit words of the predetermined size and framewords, transmit the bit words and framewords over at least one cable, and to perform adaptive cancellation based, at least in part, on the transmitted bit words and framewords to improve reception over the at least one cable by the PHY. The second transceiver module may comprise a PHY device, an I/Q module, a demodulator, and a storage device. The PHY device of the second transceiver module may be configured to receive the bit words and the framewords from over the at least one cable. The I/Q module of the second transceiver module may be configured to receive the bit words and the framewords from the PHY device of the second transceiver module and to transform the bit words to a second complex signal based, at least in part, on the framewords. The demodulator of the second transceiver module may be configured to demodulate the complex signal. The storage device of the second transceiver module may be configured to store the data within a computer readable medium.

In various embodiments, the first transceiver may further comprise an antenna and an I/Q demodulator. The antenna may be configured to receive a receiver signal. The I/Q demodulator may be configured to generate the complex signal based on the receiver signal. Further, the first transceiver module may further comprise a waveguide module and a waveguide filter. The waveguide module may be configured to receive the receiver signal from the antenna. The waveguide filter may be configured to filter the receiver signal from the waveguide and provide the filtered, receiver signal to the I/Q demodulator.

The first transceiver module may further comprise a phase lock loop and an analog-to-digital converter. The phase lock loop may be configured to provide a clock signal at a speed that is slower than an operation of the PHY device of the first transceiver module to allow for the addition of framewords by the I/Q module of the first transceiver. The analog-to-digital converter may be configured to digitally convert the complex signal based on the clock signal from the phase lock loop.

In various embodiments, the bit words of the predetermined size are 8 bit words. The predetermined size may be based on a largest size of bit words that the PHY device of the first transceiver module may transmit over the at least one cable.

The I/Q module configured to transform the complex signal into bit words of the predetermined size and framewords may comprise the I/Q module configured to transform the complex signal, which is a 12 bit stream, to 8 bit words and framewords. Further, the I/Q module configured to transform the complex signal into bit words of the predetermined size and framewords may comprise the I/Q module configured to place 8 bits from an I component of the complex signal into a first 8 bit word, to place 4 bits from the I component and 4 bits from a Q component of the complex data into a second 8 bit word, and to place 8 bits from the Q component into a third 8 bit word. Moreover, the I/Q module may be further configured to add a frameword to the first 8 bit word and a frameword to the second 8 bit word.

In some embodiments, the at least one cable is a category five Ethernet cable.

An exemplary method comprises receiving a first complex signal, transforming, by a first I/Q module, the first complex signal into bit words of a predetermined size and framewords, transmitting, by a first PHY device, the bit words of the predetermined size and framewords over at least one cable, performing, by the first PHY device, adaptive cancellation based, at least in part, on the transmitted bit words and framewords to improve reception over the at least one cable by the PHY device, receiving, by a second PHY device, the bit words and the framewords over the at least one cable, transforming the bit words, by a second I/Q module, to a second complex signal based at least in part, on the framewords, modulating, by an I/Q modulator, the complex signal to generate a transmit signal, and transmitting, by an antenna, the transmit signal.

The method may further comprise receiving a pretransmission signal and modulating the pretransmission signal to generate the first complex signal. Further, the method may further comprise generating, by a phase lock loop, a clock signal and controlling the modulation of the pretransmission signal based, at least in part, on the clock signal, the clock signal being at a speed that is slower than a transmission speed of the first PHY device to allow for the addition of framewords.

The predetermined size may be based on a largest size of bit words that the first PHY device may transmit over the at least one cable. The at least one cable may be a category five Ethernet cable.

Another exemplary method may comprise receiving a first complex signal, transforming, by a first I/Q module, the first complex signal into bit words of a predetermined size and framewords, transmitting, by a first PHY device, the bit words of the predetermined size and framewords over at least one cable, performing, by the first PHY device, adaptive cancellation based, at least in part, on the transmitted bit words and framewords to improve reception over the at least one cable by the PHY device, receiving, by a second PHY device, the bit words and the framewords over the at least one cable, transforming the bit words, by a second I/Q module, to a second complex signal based at least in part, on the framewords, demodulating, by a demodulator, the complex signal, and storing, by a storage device, data within the demodulated complex signal within a computer readable medium.

The method may further comprise receiving, by an antenna, a receiver signal and generating, by an I/Q demodulator, the complex signal based on the receiver signal. In some embodiments, the method may further comprise generating, by a phase lock loop, a clock signal and controlling the demodulation of the I/Q demodulator based, at least in part, on the clock signal, the clock signal being at a speed that is slower than a transmission speed of the first PHY device to allow for the addition of framewords.

The predetermined size may be based on a largest size of bit words that the first PHY device may transmit over the at least one cable. The at least one cable may be a category five Ethernet cable.

DETAILED DESCRIPTION OF THE INVENTION

In various embodiments, a first module of a transceiver unit (e.g., an IDU) may communicate with a second module of the transceiver unit (e.g., an ODU) over one or more Ethernet cables. PHY devices may be used to control communication over the Ethernet cables. As a result, complex filters may be avoided thereby reducing complexity and expense of the circuit. Further, the PHY devices may eliminate or reduce triple transit influences.

For example, an exemplary system may transfer a modulated transmit waveform in a digital domain from an IDU modulator through a category 5 ("CAT 5") Ethernet cable to an ODU containing digital-to-analog converters. Similarly, the system may transfer a received digitized signal from an ODU analog-to-digital converter to an IDU through a CAT 5 cable to be applied to a demodulator. The system may utilize adaptive canceling of transmission and receive signals over the CAT 5 cable using Gbps Ethernet Physical Layer (PHY) devices. In some embodiments, the system allows for addition of ODU telemetry to be added to a PHY data stream. The system may eliminate the need for coax cable, yet may retain the modem in the IDU. The system may utilize power over Ethernet to power the ODU. The system may eliminate the need for complex Nplexer filters and AGC amplifiers.

Figure 1:
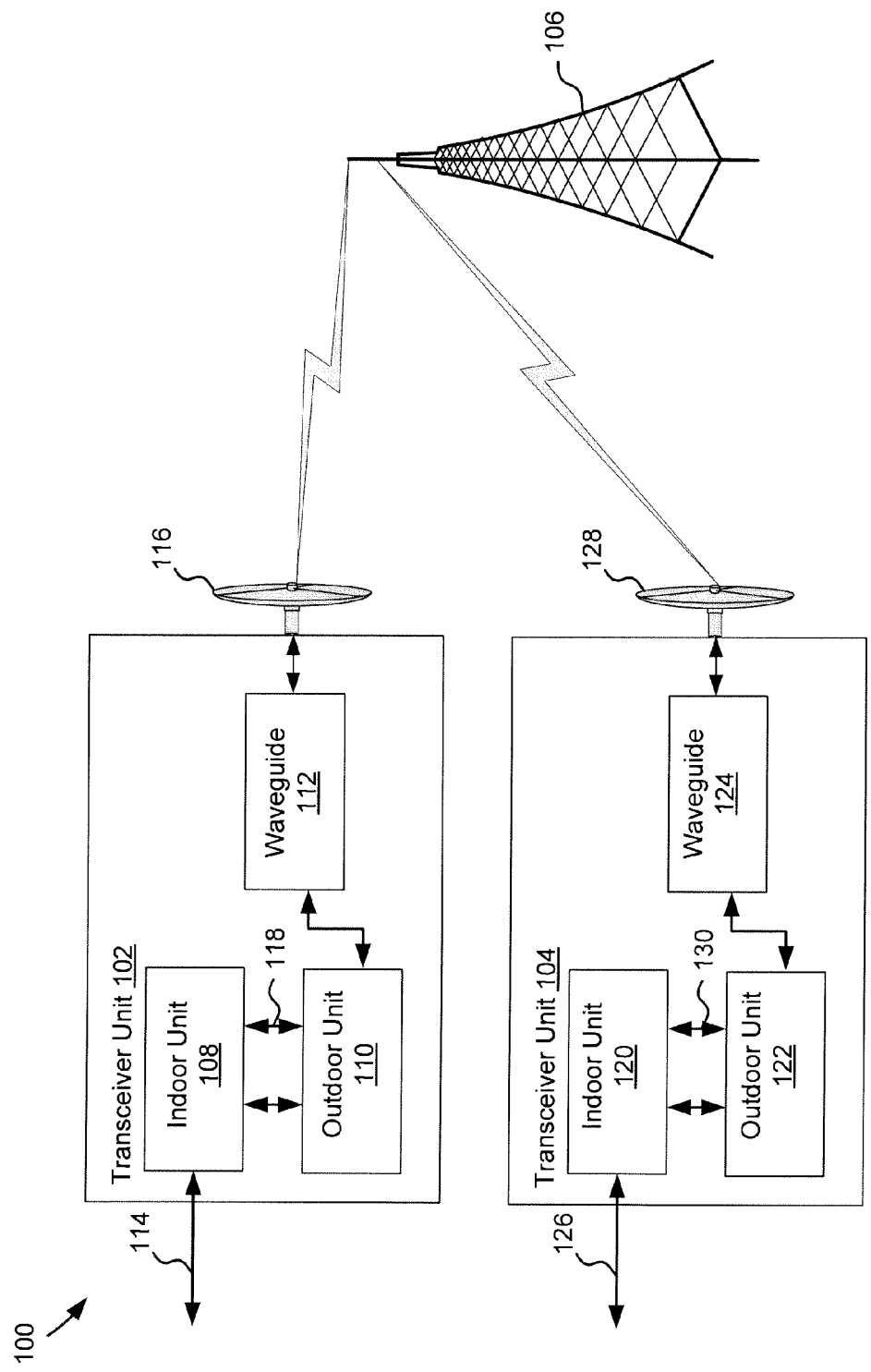
FIG. 1 is an environment including two transceiver units in some embodiments.

FIG. 1 is an environment 100 including two transceiver units 102 and 104 in some embodiments. Each of the transceiver units 102 and 104 are split mount radios. A split-mount radio has a part of the electronics mounted outdoors with an antenna and part indoors. The outdoor unit (ODU) may be the RF transmitter/receiver. The indoor unit (IDU) contains the modulator/demodulator, multiplexer, control, and traffic interface elements. The IDU and ODU may be coupled together using a cable. By comparison, an all-indoor radio has all radio equipment installed inside and is connected to its antenna using a waveguide or coax feeder. A split-mount radio may be a point-to-point radio installation for licensed 6 to 38+ GHz frequency bands with the ODU direct-mounted to the rear of the antenna to provide an integral antenna feed. By having the ODU mounted with the antenna, split-mount may eliminate or reduce feeder losses, minimize or reduce rack occupancy, and/or lower installed costs compared to indoor radios.

For example, transceiver unit 102 may comprise an indoor unit (IDU) 108 in communication with a processor and/or a digital device, an outdoor unit (ODU) 110 in communication with the IDU 108 over cables 118, a waveguide 112 in communication with the ODU 110, and an antenna 116. The IDU 108 may comprise a modulator/demodulator and control circuitry for providing data from a digital device or a processor over line 114 to the antenna 116 via the ODU 110 and/or the waveguide 112. Similarly, the IDU 108 may also be configured to receive information from the antenna 116 via the ODU 110 for providing to the digital device or processor via the line 114. The ODU 110 may comprise an RF transmitter/receiver and be coupled with the antenna 116. The waveguide 112 may or may not be a part of the ODU 110.

The IDU 108 of the transceiver unit 102 may be coupled to the ODU 110 utilizing any number of Ethernet cables such as Category 5, Category 5E, Category 6, Category 6a, Category 7, or any other kind of Ethernet cable.

Similarly, transceiver unit 104 may comprise an IDU 120 in communication with a processor and/or a digital device, an ODU 122 in communication with the IDU 120 over cables 130, a waveguide 124 in communication with the ODU 122, and an antenna 128. The IDU 120 may comprise a modulator/demodulator and control circuitry for providing data from a digital device or a processor over line 126 to the antenna 128 via the ODU 122 and/or the waveguide 124. Similarly, the IDU 120 may also be configured to receive information from the antenna 128 via the ODU 122 for providing to the digital device or processor via the line 126. The ODU 122 may comprise an RF transmitter/receiver and be coupled with the antenna 128. The waveguide 124 may or may not be a part of the ODU 122.

The IDU 120 of the transceiver unit 104 may be coupled to the ODU 122 utilizing any number of Ethernet cables such as Category 5, Category 5E, Category 6, Category 6a, Category 7, or any other kind of Ethernet cable.

In various embodiments, the IDU 108 communicates with the ODU 110 via one or more Ethernet cables. During transmission, information received via the line 114 may be converted to a complex signal and subsequently formatted as bit words of a predetermined size to be provided over the Ethernet cable(s) to the ODU 110. The ODU 110 may receive the bit words over the Ethernet cable(s), reformat the bit words to bit stream(s), and process the bit streams so as to permit wireless transmission by the antenna 116. These processes are further discussed herein.

During reception of information, information may be received by the antenna 116, converted to a complex signal and subsequently formatted as bit words of a predetermined size to be provided over the Ethernet cable(s) to the IDU 108. The IDU 108 may receive the bit words over the Ethernet cable(s), reformat the bit words to bit stream(s), and process the bit streams so as provide data to a digital device or processor via the line 114.

Those skilled in the art will appreciate that the transceiver unit 104 may perform in a manner similar to the transceiver unit 102. In various embodiments, the two transceiver units 102 and 104 may be in communication with each other over a wireless communication tower 106. Those skilled in the art will appreciate that the transceiver units 102 and 104, individually or together, may communicate with any digital device or receiver.

The wireless communication tower 106 (e.g., cell tower or other microwave radio device) may be any device configured to receive and/or transmit wireless information.

Figure 2:
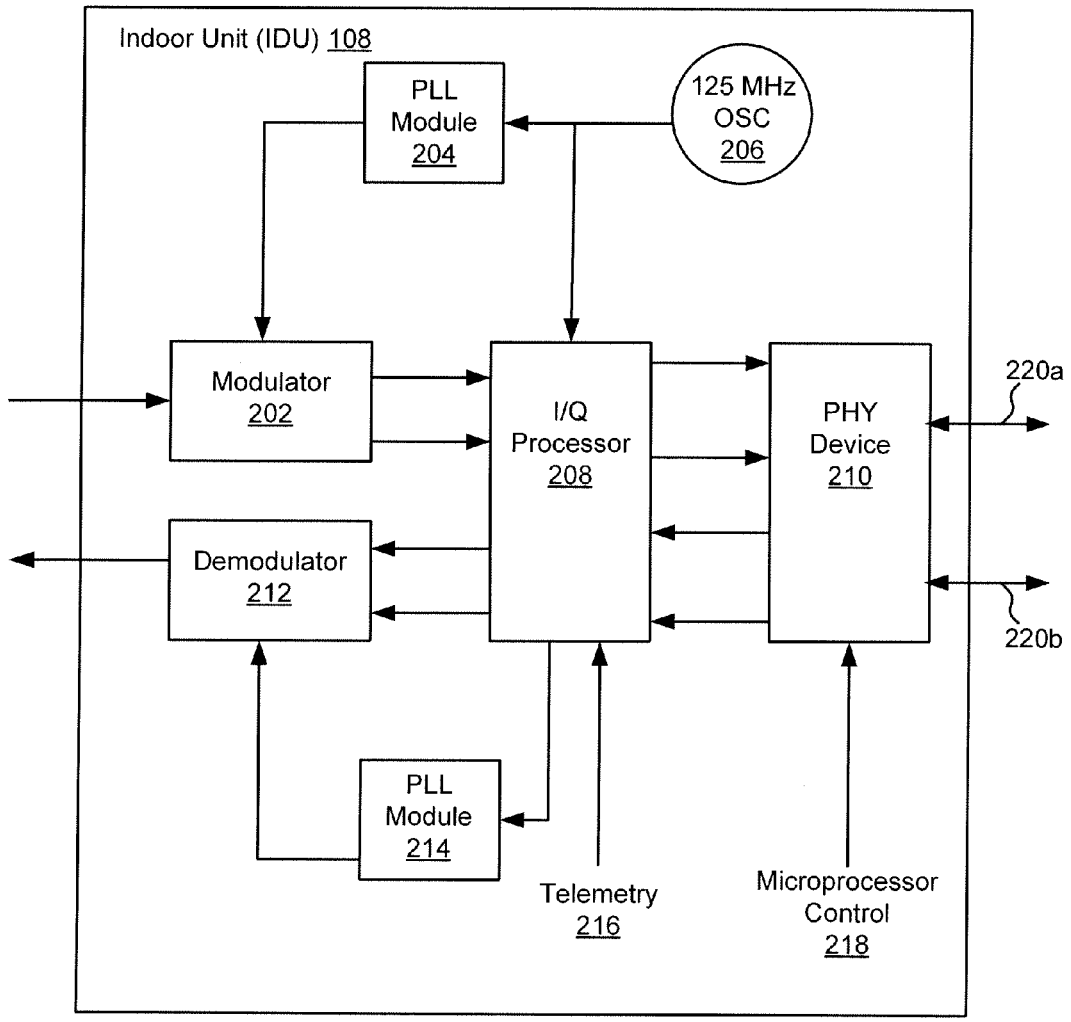
FIG. 2 is a block diagram of an indoor unit (IDU) in some embodiments.

FIG. 2 is a block diagram of an indoor unit (IDU) 108 in some embodiments. The IDU 108 comprises a modulator 202, a PLL module 204, an oscillator 206, an I/Q processor 208, a PHY device 210, a demodulator 212, and cables 220a-b. The I/Q processor 208 may receive a telemetry signal 216 and the PHY device 210 may receive a microprocessor control signal 218.

In various embodiments, the IDU 108 is a transceiver module. The modulator 202 may be coupled to a digital device, the PLL module 204, and the I/Q processor 208. In various embodiments, the modulator 202 may have multiple channels and/or communication paths to the I/Q processor 208. The PLL module 204 may be in communication with the oscillator 206 and the modulator 202. The I/Q processor 208 may be in communication with the modulator 202, the oscillator 206, the PHY device 210, the PLL module 214, and the demodulator 212. There may be multiple channels and/or paths between the I/Q processor 208 and the PHY device 210 and/or between the I/Q processor 208 and the demodulator 212. The PHY device 210 may be coupled to the I/Q processor 208, the cables 220a-b, and a microprocessor control module that provide the microprocessor control signal 218. The PLL module 214 may be coupled to the I/Q processor 208 and the demodulator 212. The demodulator 212 may be coupled to the I/Q processor 208, the PLL module 214, and a digital device or processor.

In some embodiments, the modulator 202 may be a modem or part of a modem configured to receive a signal from a processor or other circuitry and modulate a carrier signal to encode digital information. The modulator 202 may be a part of the IDU 108, a part of the digital device, or include parts in both the IDU 108 and a digital device. A digital device is any device with memory and a processor. In one example, the digital device is a server or computer that provides signals to the IDU 108 and ODU 110 to wirelessly transmit information over a microwave antenna. The modulator 202 may receive any type of signal including, for example, a QAM, FM, AM, FSK, or any kind of signal.

In various embodiments, the modulator 202 receives the signal and generates a first complex signal comprising an inphase ("I") component and a quadrature ("Q") component. The I and Q components may be provided to the I/Q processor 208. The modulator 202 may provide the I and Q components a size bit stream of any size. In some embodiments, the modulator 202 provides the I and Q components to the I/Q processor 208 as separate 12 bit streams.

The modulator 202 may receive a reduced clock signal from the phase lock loop (PLL) 204. The PLL module 204 may receive a clock signal from oscillator 206. In one example, the clock signal from the oscillator 206 is a 125 MHz clock signal. The PLL module 204 and/or other components may slow the clock signal before providing the reduced clock signal to the modulator 202.

In some embodiments, the cables 220a-b are Ethernet cables that have a limited capacity, bandwidth, and/or rate of data transfer. In various embodiments, the PHY device 210 may have a limited speed of operation. In either or both cases, the modulator 202 may receive a reduced clock signal to slow the transfer of the I and Q components to the I/Q processor 208 which may add framewords. The combination of data from the I and Q components of the first complex signal with the framewords may operate at a speed that is acceptable and/or within tolerances of the PHY device 210 and/or cables 220a-b.

The PLL module 204 and PLL module 214 may be any phase lock loops configured to provide a clock signal or signal from the I/Q processor 208, respectively. The PLL module 204 may receive a clock signal from the oscillator 206. The PLL module 204 may correct the phase of the signal from the oscillator 206 and/or reduce the clock signal. The clock signal from the PLL module 204 may be provided to the modulator 202. The modulator 202 may operate based on the clock signal received from the PLL module 204.

The PLL module 214 may also receive a clock signal from the I/Q processor 208 or any other signal. The demodulator 212 may demodulate a complex signal received from the I/Q processor 208 using, at least in part, a signal provided by the PLL module 214.

The I/Q processor 208 may be any processor (e.g., an ASIC, FPGA, or other device comprising a processor) configured to receive the I and Q components from the modulator 202, generate bit words of a predetermined size based on the I and Q components, and add framewords as needed. The I/Q processor 208 may provide the bit words and framewords to the PHY device 210. The I/Q processor 208 may also be configured to receive bit words of a predetermined size and framewords from the PHY device 210 to generate complex bit streams for the demodulator 212.

A frameword is any word or set of binary numbers that may be used to separate or delaminate information from the I and Q components. In one example, the framewords are used to separate and/or delimit the bit words of the predetermined size. Based on the framewords, the PHY device 302 and/or the I/Q processor 304 of the ODU 110 may identify the bit words of predetermined size.

The predetermined size of the bit words may be limited to capability or limitations associate with the PHY device 210 of the IDU, PHY device 302 of the ODU, or cables 220a-b. In some embodiments, the predetermined size may be 8 bit (e.g., the I/Q processor 208 generates 8 bit words based on the I and Q components of the first complex signal from the modulator 202). Those skilled in the art will appreciate that the predetermined size may be any size and, as a result, the bit words generated by the I/Q processor 208 may be of any size.

In various embodiments, the I/Q processor 208 receives a telemetry signal 216 from a telemetry module. In various embodiments, the telemetry module may be a digital device (e.g., the digital device that provided the signal to the modulator 202 or receives the demodulated signal from the demodulator 212. In some embodiments, the telemetry signal 216 may be based on telemetry information provided by the ODU 110. The telemetry information may control or affect communication between the IDU 108 and ODU 110. In some embodiments, the telemetry information may control the configuration, direction, or properties of the antenna that is coupled to or included within the ODU 110.

The I/Q processor 208 may provide all or some of the information from the telemetry signal to the ODU 110 via the PHY device 210 and cables 220a-b. In some embodiments, the telemetry information is provided over a separate channel or separate cable. Those skilled in the art will appreciate that there may be many ways to provide telemetry information from the telemetry signal 216 to the ODU 110.

The I/Q processor 208 may operate at 125 MHz, or any clock speed. For example, the I/Q processor 208 may receive a 125 MHz clock signal from oscillator 206. The I/Q processor 208 may provide the bit words and the framewords at or below the clock speed of the oscillator 206 to the PHY device 210.

There may be many paths and channels between the I/Q processor 208 and the PHY device 210. In various embodiments, the I/Q processor 208 provides one or more bit words, framewords, or a combination of both over different paths. Similarly, the I/Q processor 208 may receive data from the PHY device 210 over any number of different paths.

The PHY device 210 may be an Ethernet physical transceiver (e.g., a 1 Gb Ethernet physical transceiver) that operates at physical layer of OSI network model. The PHY device 210 may implement hardware send and receive functions of Ethernet frames. The PHY device 210 may interface to line modulation at one end and binary packet signaling at the other. Some examples of Ethernet PHYceiver chips include, but are not limited to, are Integrated Circuit Systems ICS1893, Realtek RTL8201 and VIA Technologies VIA6103. In various embodiments, the PHY device 210 receives the bit words of predetermined size and the framewords to provide over the cables 220a-b to another PHY device 302 of the ODU 110. In various embodiments, the PHY device 210 is controlled by a microprocessor control signal 218 from a microprocessor controller. In some embodiments, the microprocessor controller is a digital device configured to control at least a portion of a function of the PHY device 210.

In various embodiments, the PHY device 210 may receive the bit words and framewords from the I/Q processor 208 and provide the bit words and framewords over the cable(s) 220a and/or 220b. Those skilled in the art will appreciate that there may be any number of cables between PHY device 210 of the IDU and the PHY device 302 of the ODU 110.

In some embodiments, the PHY device 210 may receive bit words and framewords from the PHY device 302 of the ODU 110. The bit words may contain information to be provided by the demodulator 212 (e.g., to a digital device or server on a wired network). The PHY device 210 may provide the bit words and framewords to the I/Q processor 208.

The demodulator 212, like the modulator 202, may be a modem or part of a modem configured to receive a signal from a processor or other circuitry and modulate a carrier signal to encode digital information. The demodulator 212 may be a part of the IDU 108, a part of the digital device, or include parts in both the IDU 108 and a digital device.

The demodulator 212 may be configured to receive information provided to an antenna to provide to a digital device. In various embodiments, information is received via an antenna and the ODU 110. The PHY device 210 may receive the information over the cables 220a-b and the I/Q processor 208 may provide I and Q components of a second complex signal based on the information received from the antenna. The demodulator 212 may demodulate the information to provide to a digital device or memory.

The PLL module 214 may provide a clock or control signal from the I/Q processor 208 to control the demodulator 212. In various embodiments, the PLL module 214 may provide an increased rate clock signal to control the demodulator 212 to accommodate a speed of transmission of the I/Q processor 208 and/or accommodate the requirements and/or capacities of one or more digital devices in communication with the PLL module 214.

The cables 220a-b may be any cables such as Ethernet cables. For example, the cables 220a-b may comprise category 5, category 5e, category 6, category 6a, category 7, or any other kind of Ethernet cables.

It will be appreciated that a "module" may comprise software, hardware, firmware, and/or circuitry. In one example one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently.

Figure 3:
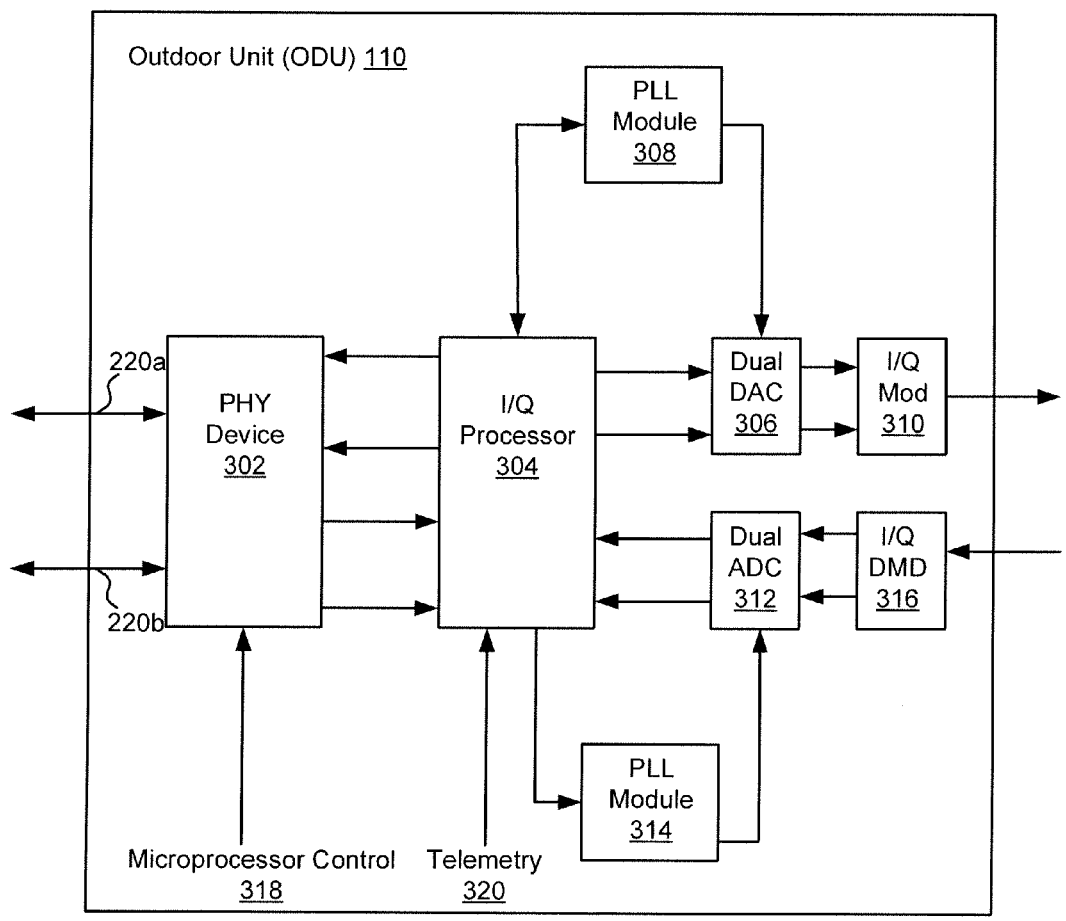
FIG. 3 is a block diagram of an outdoor unit (ODU) in some embodiments.

FIG. 3 is a block diagram of an outdoor unit (ODU) 110 in some embodiments. The ODU 110 comprises a PHY device 302, an I/Q processor 304, a dual digital-to-analog converter (DAC) 306, a PLL module 308, an I/Q modulator 310, a dual analog-to-digital converter (ADC) 312, a PLL module 314, and an I/Q demodulator 316. The PHY device 302 may receive a microprocessor control signal 318. The I/Q processor 304 may receive a telemetry signal 320.

In various embodiments, the ODU 110 is a transceiver module. The PHY device 302 of the ODU 110 may be in communication with the two cables 220a-b, a microprocessor control device, and the I/Q processor 304. There may be multiple channels and/or paths between the PHY device 302 and the I/Q processor 304. The I/Q processor 304 may be in communication with the PHY device 302, the PLL module 308, the dual DAC 306, the dual ADC 312, the PLL module 314, and a telemetry module. There may be multiple channels and/or paths between the I/Q processor 304 and the PHY device 302, the I/Q processor 304 and the dual DAC 306, and/or between the I/Q processor 304 and the dual ADC 312. The dual DAC 306 may be in communication with the I/Q processor 304, the PLL module 308, and the I/Q modulator 310. There may be multiple channels and/or paths between the dual DAC 306 and the I/Q processor 304 and/or the dual DAC 306 and the I/Q modulator 310. The I/Q modulator 310 may be in communication with the dual DAC 306 and an antenna. In some embodiments, the I/Q modulator 310 may be in communication with a downconverter, filter, waveguide, waveguide filter, and/or antenna. The dual ADC 312 may be in communication with the I/Q processor 304, the PLL module 314, and the I/Q demodulator 316. There may be multiple channels and/or paths between the dual ADC 312 and the I/Q processor 304 and/or the dual ADC 312 and the I/Q demodulator 316. The PLL module 314 may be in communication with the I/Q processor 304 and the dual ADC 312. Similarly to the I/Q modulator 310, the I/Q demodulator 316 may be in communication with a downconverter, filter, waveguide, waveguide filter, and/or antenna. Further, the I/Q demodulator 316 may be in communication with the dual ADC 312.

The PHY device 302 of the ODU 110, like the PHY device 210 of the IDU 108, may be an Ethernet physical transceiver that operates at physical layer of OSI network model. The PHY device 210 may implement hardware send and receive functions of Ethernet frames. The PHY device 210 may interface to line modulation at one end and binary packet signaling at the other. In various embodiments, the PHY device 302 receives the bit words of predetermined size and the framewords over the cables 220a-b from the PHY device 210 of the ODU 110. The PHY device 210 may provide the bit words and framewords to the I/Q processor 304. Those skilled in the art will appreciate that there may be any number of channels and/or paths between the PHY device 302 and the I/Q processor 304

In various embodiments, the PHY device 302 may receive the bit words of predetermined size and the framewords from the I/Q processor 304. For example, data may be received by an antenna and may be provided through the ODU 110 to the IDU 108 via the cables 220a-b to be demodulated by the demodulator 212 and provided to a digital device.

In some embodiments, the PHY device 302 is controlled by a microprocessor control signal 318 from a microprocessor controller. In some embodiments, the microprocessor controller is a digital device configured to control at least a portion of a function of the PHY device 302.

The I/Q processor 304 of the ODU 110, like the I/Q processor 208 of the IDU 108, may be any processor (e.g., an ASIC, FPGA, or other device comprising a processor) configured to receive the I and Q components from the PHY device 302 or the antenna (e.g., via the dual ADC 312), generate bit words of a predetermined size based on the I and Q components, and add framewords as needed. The I/Q processor 208 may provide the bit words and framewords to the PHY device 302 to provide to the IDU 108 via cables 220a-b or provide the bit words and framewords to the antenna (e.g., via the dual DAC 306 and the I/Q modulator 310).

In some embodiments, the I/Q processor 304 identifies and transforms the bit words, based on the framewords, to bit streams which may be provided to the dual DAC 306. The bit streams may be 12 bit streams. Those skilled in the art will appreciate that the bit streams may be of any size.

As discussed herein, the predetermined size of the bit words may be limited to capability or limitations associate with the PHY device 210 of the IDU 108, PHY device 302 of the ODU 110, or cables 220a-b. In some embodiments, the predetermined size may be 8 bit (e.g., the I/Q processor 304 generates 8 bit words based on the I and Q components of the complex signal from the I/Q modulator 310 and/or the dual DAC 306).

In various embodiments, the I/Q processor 304 receives a telemetry signal 320 from a telemetry module. In various embodiments, the telemetry module may be a digital device. In some embodiments, the telemetry signal 320 may be based on telemetry information provided by the IDU 108. The telemetry information may control or affect communication between the IDU 108 and ODU 110. In some embodiments, the telemetry information may control the configuration, direction, or properties of the antenna that is coupled to or included within the ODU 110.

The I/Q processor 304 may provide all or some of the information from the telemetry signal to the IDU 108 via the PHY device 302 and cables 220a-b. In some embodiments, the telemetry information is provided over a separate channel. Those skilled in the art will appreciate that there may be many ways to provide telemetry information from the telemetry signal 216 to the IDU 108.

The I/Q processor 304 may operate at 125 MHz, or any clock speed. The I/Q processor 304 may receive a clock signal from an oscillator, PLL, or any device or component. In some embodiments, the I/Q processor 304 recovers a clock signal from the IDU 108 (e.g., during set up communication between the IDU 109 and the ODU 110 or during communication such as retrieved from the data). Further, in some embodiments, the I/Q processor 304 may receive a clock signal from the IDU (e.g., through the telemetry data).

In some embodiments, the I/Q processor 304 may provide a clock signal o PLL module 308 which may correct the phase of the clock signal and/or increase the clock signal. In one example, the I/Q processor 304 receives bit words and framewords from the PHY device 302. The I/Q processor 304 may identify the data of the bit words based on the location and/or detection of the framewords. Subsequently, the I/Q processor 304 may generate one or more bit streams based on the bit words. The bit streams (e.g., 12 bit streams) as well as the clock signal via the PLL module 308 may be provided to the dual DAC 306 to convert the signals to analog before the I/Q modulator 310 modulates the signals for transmission over the antenna.

The dual DAC 306 may be any DAC configured to convert one or more bit streams from the I/Q processor 304 to analog signals. The analog signals may be received by the I/Q modulator 310 which may modulate and/or process the signal to prepare for wireless transmission over the antenna. The dual DAC 306 may operate at a speed based on a signal received from the PLL module 308. The I/Q modulator 310 is any modulator configured to modulate analog I and Q components. The modulated signal(s) from the I/Q modulator 310 may be upconverted by an upconverter and/or provided to an antenna for wireless transmission. In various embodiments, the modulated signal(s) from the I/Q modulator 310 may be upconverted, filtered by a waveguide filter, guided by a waveguide, and transmitted by an antenna (e.g., in a microwave system).

In various embodiments, a wireless signal may be received by an antenna, guided by a waveguide, filtered by a waveguide filter, and downconverted before the I/Q demodulator 316 demodulates the received signal. Those skilled in the art will appreciate that the waveguide, waveguide filter, and downconverter may be optional.

The waveguide may be any waveguide kind or type of waveguide. For example, the waveguide may be hollow or dielectric. In some embodiments, the waveguide comprises a rectangular to circular waveguide. The waveguide filter may be any filter coupled to the waveguide and configured to filter the electromagnetic waves from the waveguide (e.g., remove noise).

The I/Q demodulator 316 may be any I/Q demodulator 316 configured to generate, based on a signal received by the antenna, a complex signal and provide the I and Q components to the dual ADC 312. The dual ADC 312 may convert the I and Q components to digital signal(s) before providing the digital components to the I/Q processor 304. In various embodiments, the dual ADC 312 operates based on a clock signal received via the PLL module 314. In various embodiments, the clock signal via the PLL module 314 is a reduced clock signal. For example, the signals received by the antenna and/or demodulated by the I/Q demodulator 316 may be bit streams (e.g., 12 bit streams). The dual ADC 312 may be controlled by the reduced clock rate to provide the digital bit streams to the I/Q processor 304 more slowly thereby allowing the I/Q processor 304 to add framewords and other information and still meet an efficient, available speed of the PHY device 302 and/or the limitations of the cables 220a-b.

The PLL module 314 may receive the clock signal or any other information from the I/Q processor 304 to provide the clock signal or a reduced clock signal to the dual ADC 312. In some embodiments, the I/Q processor 304 recovers a clock signal from the IDU 108.

Those skilled in the art will appreciate that one or more software programs comprising instructions capable of being executable by a processor may perform one or more of the functions of the modules described herein. In another example, circuitry may perform the same or similar functions. Alternative embodiments may comprise more, less, or functionally equivalent modules and still be within the scope of present embodiments. For example, as previously discussed, the functions of the various modules may be combined or divided differently There may be many paths and channels between the I/Q processor 304 and the PHY device 302. In various embodiments, the I/Q processor 304 provides one or more bit words, framewords, or a combination of both over different paths. Similarly, the I/Q processor 208 may receive data from the PHY device 210 over any number of different paths.

In various embodiments, the PHY device 210 of the IDU 108 and the PHY device 302 of the ODU 110 may perform setup communications. For example, the PHY device 210 and the PHY device 302 may synchronize, calibrate, and/or initialize communications. In some embodiments, the PHY device 210 and the PHY device 302 perform setup communications to confirm the use of framewords, provide an indication as to where the framewords are expected to be in transmitted data, and/or confirm communication of identified framewords.

Figure 4:
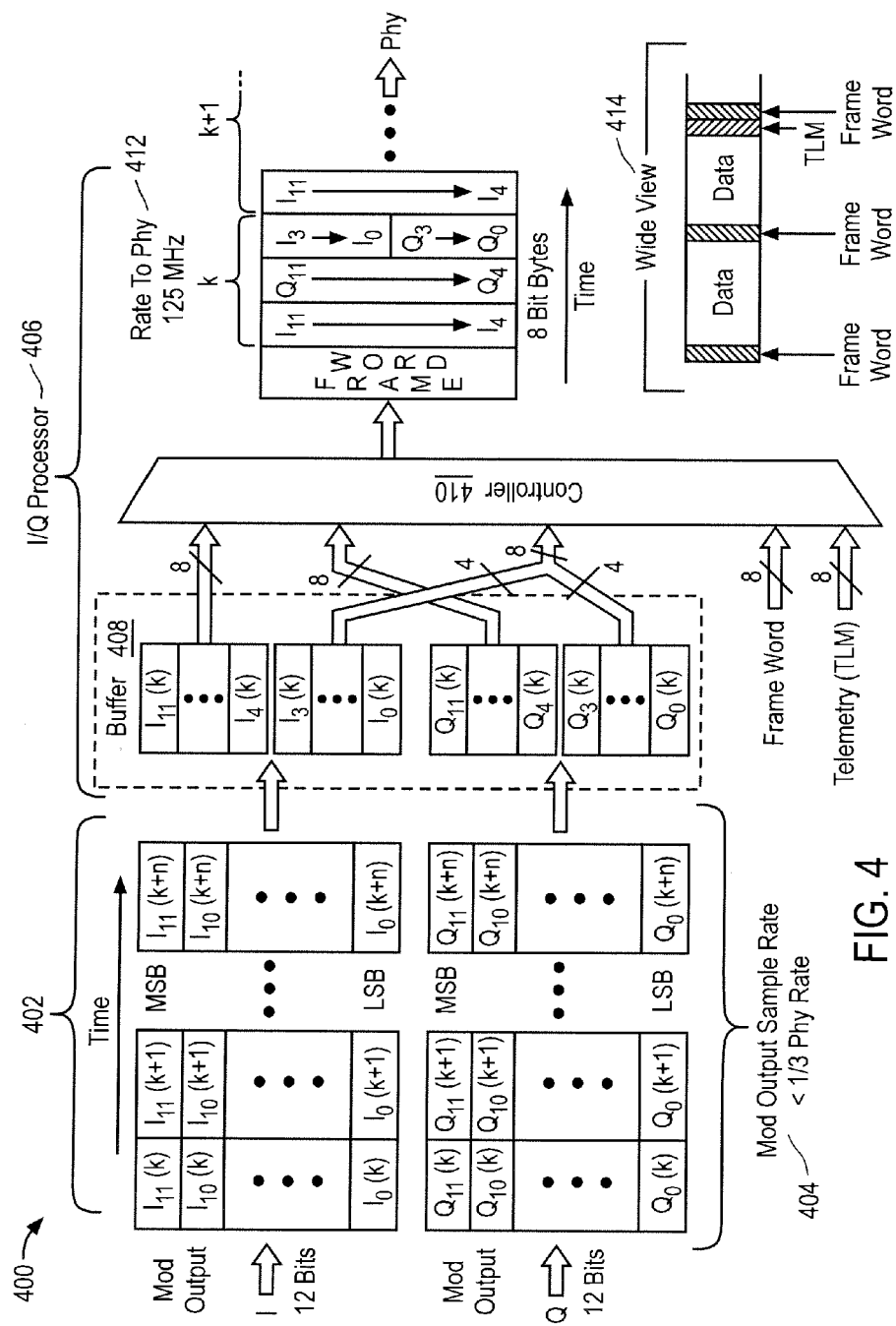
FIG. 4 is a diagram of an exemplary process for transforming complex bit streams to bit words as may be performed by the I/Q processor in some embodiments.

FIG. 4 is a diagram of an exemplary process 400 for transforming complex bit streams to bit words as may be performed by the I/Q processor 406 in some embodiments. The I/Q processor 406 (e.g., 208 and/or 304) may receive complex bit streams including, for example, an I component bit stream 402 and a Q component bit stream 404. The I/Q processor 406 may process to the 12 bit streams into a 8 bit byte data stream for application to the PHY device. At each respective destination, the PHY device output may be taken apart and assembled back into two I and Q 12 bit words after the frame word is detected. Once loss of frame word occurs, there may be another re-initialization of the ODU and IDU PHY devices.

In some embodiments, the I component bit stream and the Q component bit stream may be sorted based on most significant bit (MSB) to least significant bit (LSB). The I/Q processor 406 may buffer the bit streams with one or more buffers 408 and a controller 410 (e.g., a multiplexer) may multiplex the buffered bit streams, framewords and telemtry (TLM) to create a signal including 8 bit words formatted with framewords and the TLM.

The first 8 bit word may include 8 bits from the I component bit stream. The second 8 bit word may include 4 bits from the I component bit stream and 4 bits from the Q component bit stream. The last 8 bit word may include 8 bits from the Q component bit stream. In various embodiments, the 8 bit word with 8 bits from the I component bit stream may include the most significant bits (MSB) of the I component bit stream at that time interval. Similarly, the 8 bit word with the 8 bits from the Q component bit stream may include the most significant bits (MSB) of the Q component bit stream at that time interval. The 8 bit word that includes 4 bits from each of the component bit streams may include the least significant bits (LSB) from the I component bit stream and the least significant bits (LSB) from the Q component bit stream as appears in diagram 412. The bit words may be separated by framewords and/or telemetry information (TLM) as depicted in diagram 414.

Those skilled in the art will appreciate that the bit words may include any bits from the bit streams. The bits of the bit streams may be sorted or not sorted. In some embodiments, the bits in the 8 bit words may include different bits (e.g., the first 8 bit word may include the least significant bits from the I component bit stream or the first 8 bit word may include a combination of bits of any significance). Those skilled in the art will appreciate that the first 8 bit word may not necessarily be created before other bit words. As such, any bit word may include any number of bits from the I component bit stream, the Q component bit stream, or a combination of the two. Further, the bit words may be of any size and are not limited to 8 bits. Similarly, the bit streams may be of any size.

Figure 5:
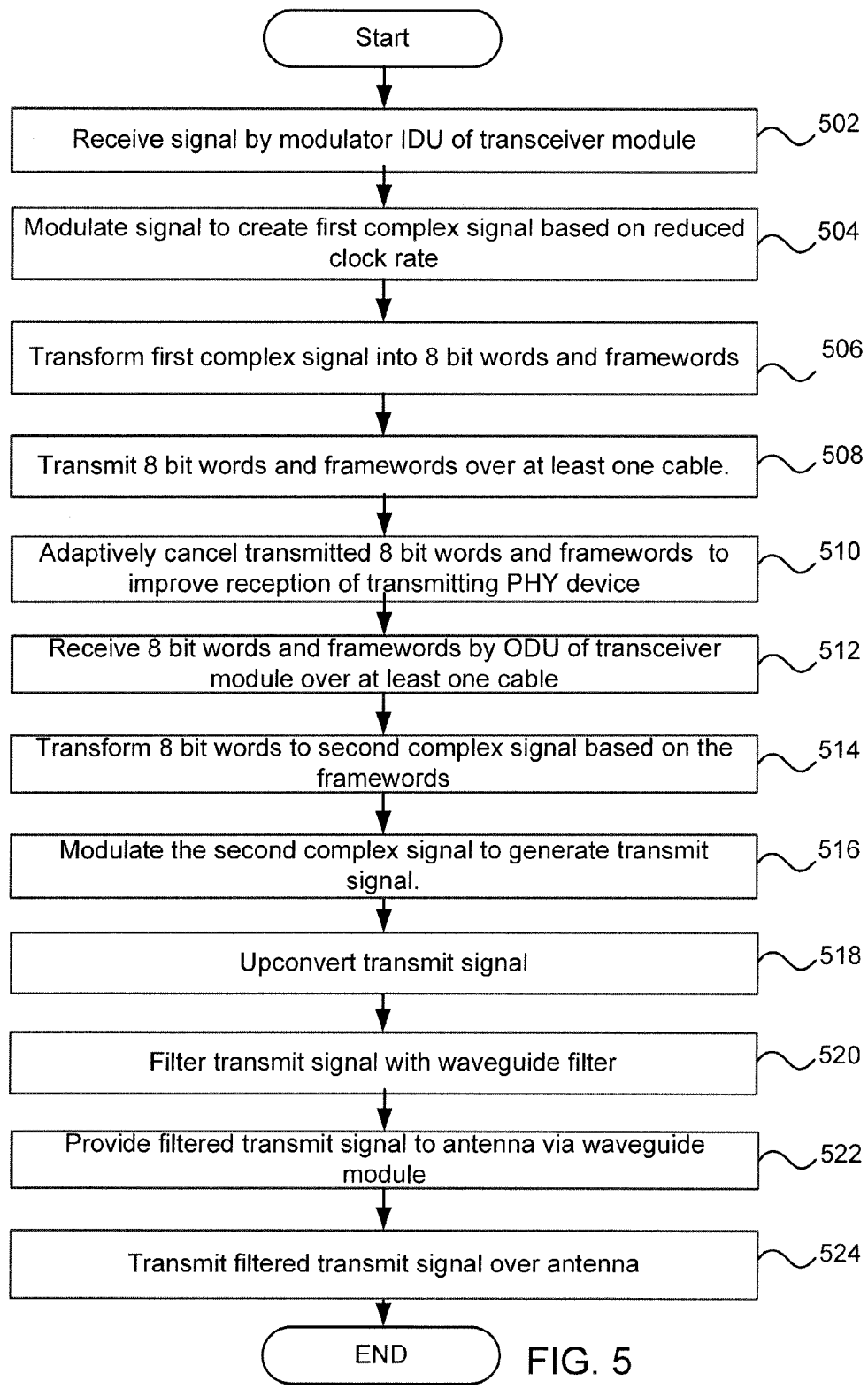
FIG. 5 is a flowchart for transmitting data over a split mount radio in some embodiments.

FIG. 5 is a flowchart for transmitting data over a split mount radio in some embodiments. In general, on the transmission side, in some embodiments, I and Q IDU modulated data (usually 12 bits each) are digitized at a slower word rate than 125 MHz. The 12 bits of data on each stream may be processed by an I/Q processor 208 by parsing the I and Q streams into 8 bit bytes at 125 MHz suitable for applying to a 1 Gbps PHY. Using two ports on the PHY device 210, the data may be transferred to the ODU PHY device 302 where the data may be detected and then passed to an ODU I/Q processor 304 where the data stream may be assembled into I/Q 12 bit words that may be applied to the ODU dual DAC 306 then applied to a dual I/Q modulator 310 operating at any chosen IF frequency. The recovered clock on the ODU PHY device 110 may be used to drive a PLL to generate a sampling clock for the DAC 306.

In step 502, the modulator 202 of the IDU 108 receives a signal. In various embodiments, a digital device includes or is in communication with the modulator 202. The digital device, such as a server that may be in communication with a network over fiber or other wire, may provide information to the modulator 202 to wirelessly transmit to a different transceiver unit (e.g., mobile unit, base station, or the like).

Those skilled in the art will appreciate that the modulator 202 may be a part of the digital device, a part of the IDU 108, or both the digital device and the IDU 108 include a separate modulator.

In step 504, the modulator 202 modulates the signal received from the digital device to create a first complex signal based on a reduced clock rate. The modulator 202 may generate I and Q components of the modulated signal. In some embodiments, the modulator 202 receives a clock signal from PLL module 204. The PLL module 204 may receive a 125 MHz clock signal from oscillator 206. In various embodiments, the PLL module 204 reduces the speed of the clock signal received from the oscillator 206 and/or the modulator 202 reduces the speed of the clock rate. As discussed herein, the I/Q processor 208, PHY device 210, and/or the cables 220a-b may be limited by a speed of data (e.g., 125 MHz). Since the I/Q processor 208 may add frameworks to the information received from the modulator 202, the information received from the modulator 202 and the frameworks may, in one example, be at a speed that does not exceed the maximum speed of the I/Q processor 208, the PHY device 210, and/or the cables 220a-b. By reducing the speed of modulation, the modulator 202 may provide the first complex signal at a speed that accommodates the extra overhead added by the I/Q processor 208.

In step 506, the I/Q processor 208 may transform the first complex signal to bit words of a predetermined size and frameworks. In various embodiments, the first complex signal may be provided to the I/Q processor 208 as one or more bit streams. In one example, the modulator 202 may provide the I and Q components as separate 12 bit streams to the I/Q processor 208. The PHY device 210, however, may not handle bit streams and may require bit words. The I/Q processor 208 may transform the bit streams to bit words and frameworks such that the PHY device 210 may transmit the information over the cables 220a-b. Further, the size of the bit words may be limited by the I/Q processor 208, the PHY device 210, and/or the requirements of cables 220a-b. In one example, the bit words are 8 bit words (i.e., the predetermined size is 8 bit).

In step 508, the PHY device 210 of the IDU 108 transmits the bit words of predetermined size over the cables 220a-b. The cables 220a-b may be, for example, Ethernet cables such as category 5, category 5e, category 6, or category 6a Ethernet cables.

In step 510, the PHY device 210 may adaptively cancel transmitted bit words of predetermined size and framewords to improve reception of the PHY device 210. In some embodiments, the PHY device 210 may actively receive and transmit over any number of cables 220a-b. In order to improve reception over the cable, the PHY device 210 may adaptively cancel (e.g., at the PHY device 210's receiver) signals that are transmitted by the PHY device 210. In one example, the adaptive cancellation may cancel signals that are reflected along the cables 220a-b back to the PHY device 210.

In step 512, the PHY device 302 of the ODU 110 may receive the bit words of predetermined size the framewords over the cables 220a-b. In step 514, the I/Q processor 304 transforms the bit words of predetermined size (e.g., 8 bit words) to a second complex signal using the frameworks. The I/Q processor 304 may detect and/or identify framewords from the PHY device 302. The I/Q processor 304 may identify the 8 bit words based, in part, on the frameworks. The I/Q processor 304 may provide I and Q components of the 8 bit words to the dual DAC 306. The I and Q components may be provided to the dual DAC 306 as a bit stream (e.g., two 12 bit streams).

In step 516, the I/Q modulator 310 may modulate the I and Q components from the dual DAC 306 to generate a transmit signal (i.e., a signal to be transmitted). The transmit signal may or may not be complex.

In step 518, the transmit signal(s) from the I/Q modulator 310 may be upconverted by an upconverter to an intermediate or final frequency. In various embodiments, there may be any number of upconverters and/or downconverters configured to change the frequency of the transmit signal.

In step 520, a waveguide filter filters the upconverted signal. In various embodiments, the transmit signal will be transmitted via a microwave system. In step 522, a waveguide module (e.g., a waveguide), guides the filtered transmit signal from the waveguide filter to one or more antennas. In step 524, the one or more antennas may transmit the guided, filtered, transmit signal.

Figure 6:
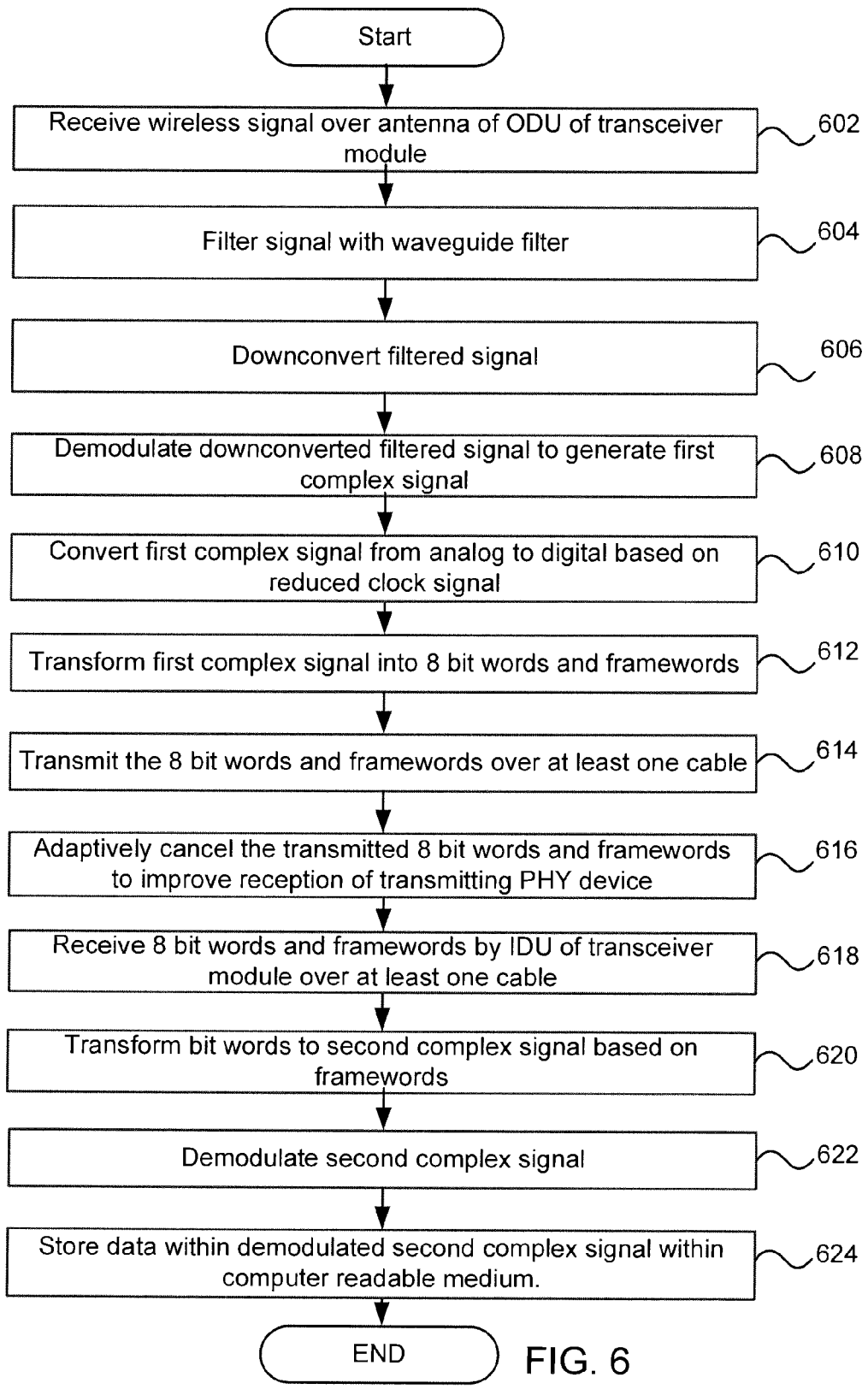
FIG. 6 is a flowchart for receiving data from an antenna over a split mount radio in some embodiments.

FIG. 6 is a flowchart for receiving data from an antenna over a split mount radio in some embodiments. In general, on the receiver side, in some embodiments of the systems and methods described herein, demodulated I/Q received signal may be digitized with a dual ADC 312 using a sampling clock from the recovered 125 MHz ODU PHY device 302. The sampling clock may be less than 125 MHz. The ODU I/Q processor 304 may then assemble the two received 12 bit data streams into two 125 Mbyte signals suitable for the ODU PHY. The signal may be passed down the same pair of CAT 5 cables as the transmission signal discussed regarding FIG. 5 by utilizing the adaptive canceling of the Gbit PHY devices. Once processed by the IDU PHY device 210 on the receiver side, I/Q processor 208 may create the two I/Q receiver data streams for application to the demodulator 212. The sampling clock may be derived from the 125 MHz receiver PHY device 210 is used to clock the 12 bit receiver data into the demodulator. Since the sampling signals may be derived from the 125 MHz clock for the IDU and ODU PHY device circuits, the actual symbol rate that may be transmitted over two pairs of CAT 5 cable may be limited. The symbol rate may be increased by fully utilizing a four port PHY with 4 CAT 5 cables. This may allow symbol rates up to 50 Mega symbols/sec. The transfer of data may start after normal auto negotiation between PHY devices is complete. The data being transferred may be preceded by a header that indicates the starting of the coding sequence for the far end I/Q processor. The header may be placed periodically in the data stream for signal integrity. Part of the header may be used to pass telemetry between the IDU 108 and ODU 110.

In step 602, a wireless signal is received over an antenna of (or in communication with) an ODU 110. In various embodiments, the antenna may be a microwave antenna configured to receive microwave signals. Those skilled in the art will appreciate that different antennas or a plurality of antennas may be used to receive the wireless signal. For example, the antenna may be configured to receive a signal over LTE, WiMax, HSPA+, or the like.

In step 604, the received wireless signal received by the antenna may be guided with a waveguide and subsequently filtered by a waveguide filter. In one example, the antenna is a microwave antenna configured to receive a microwave signal. The waveguide and/or waveguide filter may operate as an RF feeder.

In step 606, a downconverter may downconvert the filtered signal filtered by the waveguide filter. As discussed herein, the downconverter may comprise or receive a signal from an oscillator. The signal from the oscillator may be filtered and then combined with the filtered signal to downconvert the filtered signal. In some embodiments, the downconverter may downconvert the signal to an IF signal or to a signal of any frequency.

In step 608, the I/Q demodulator 316 may demodulate the downconverted, filtered signal from the downconverter to generate the first complex signal. As discussed herein, the received signal may be decomposed to complex components including an inphase (I) component and a quadrature (Q) component. In various embodiments, the complex signal may be at 12 bits per second bit stream. In one example, the I/Q demodulator 316 may provide the I component and the Q component as separate 12 bit streams to the dual analog-to-digital converter (ADC) 312.

In step 610, the ADC 312 may convert the complex signal (e.g., the I and Q components) from the I/Q demodulator 316 to a digital signal based on a reduced clock signal. As discussed herein, the I/Q processor 304 and/or the PHY device 302 may be limited by the speed they can perform or the speed of data at which the cables 220a-b can transport. In order to synchronize and/or coordinate data flow, the PLL module 314 may provide a clock speed to the ADC 312 that is slower than the speed that the I/Q processor 304, PHY device 302, or cables 220a-b may support. In some embodiments, the PHY device 302 and or the cables 220a-b may be limited to 125 MHz operation. Since the I/Q processor 304 (discussed herein) may add one or more framewords during processing, the PLL module 314 may reduce the speed of the clock signal of the ADC 312 to provide the data to the I/Q processor 304 at a reduced rate thereby allowing the addition of framewords by the I/Q processor 304 without exceeding the maximum speed at which data may be efficiently provided by the PHY device 302 and/or over the cables 220a-b.

In step 612, the I/Q processor 304 receives and transforms the digitally converted I and Q component 12 bit streams to 8 bit words and framewords. In various embodiments, the I and Q components may be at any speed or size bit stream and the I/Q processor 304 may transform the bit stream to a bit words of a predetermined size. The predetermined size may be limited by the requirements of the PHY device 302 and/or the cables 220a-b (e.g., category 5 Ethernet cable). In one example, the I/Q processor 304 transforms the bit stream of the complex signal to 8 bit words. The I/Q processor 304 may also add framewords to the 8 bit words to assist in data retrieval after the 8 bit words and framewords are provided over the cables 220a-b.

In step 614, the PHY device 302 may transmit the 8 bit words and framewords from the I/Q processor 304 over the cable(s) 220a-b. As discussed herein, the PHY device 302 may be configured to communicate with another PHY device (such as PHY device 210) over the cables 220a-b. In various embodiments, the I/Q processor 304 provides the bit words at a predetermined size and the framewords in a manner to meet the size and/or speed requirements of the PHY device 302 and/or the requirements of cables 220a-b.

In step 616, the PHY device 302 may adaptively cancel the transmitted 8 bit words and framewords to improve the reception of the transmitting PHY device 302. As discussed herein, the PHY device 302 may actively receive and transmit over any number of cables. In order to improve reception over the cable, the PHY device 302 may adaptively cancel (e.g., at the PHY device 302's receiver) signals that are transmitted by the PHY device 302. In one example, the adaptive cancellation may cancel signals that are reflected along the cables 220a-b back to the PHY device 302.

In step 618, the PHY device 210 of the IDU 108 may receive the 8 bit words and the framewords from the PHY device of the ODU 110. In step 620, the I/Q processor 208 of the IDU 108 may transform the 8 bit words received by the PHY device 210 in step 618 to a second complex signal based on the framewords. As discussed herein, the framewords may allow the information provided over the cables 220a-b to be formatted and/or processed. The I/Q processor 208 may identify and/or confirm the framewords to identify the 8 bit words. The I/Q processor 208 may transform the identified 8 bit words into I and Q components of the second complex signal.

In various embodiments, the I/Q processor 208 may provide the second complex signal at a clock speed (e.g., 125 MHz) configured to take advantage of capability of the demodulator 212 and/or a digital device that may be in communication with the demodulator 212.

In step 622, the demodulator 212 may demodulate the complex signal (i.e., the I and Q components) received from the I/Q processor 208. The demodulator 212 may generate a new signal that is not complex or may provide I and Q components of the demodulated signal. In various embodiments, the demodulator 212 may receive the I and Q components from the I/Q processor 208 at a reduced speed. The demodulator 212 may provide the demodulated signal at an increased clock speed provided by the PLL module 214.

In step 624, a processor stores data from within the demodulated second complex signal within a computer readable medium. For example, a digital device may retrieve the information of the 8 bits words that was transmitted over the cables 220a-b. The demodulator 212 may demodulate the complex signal such that the digital device may store the data. The computer readable medium may be any hard drive, flash, or other non-transitive memory. In various embodiments, the digital device may receive the demodulated signal from the demodulator 212 from over a wired network, such as a LAN, WAN, or the Internet. In some examples, the digital device may store the data within a local computer readable storage, within another digital device, within other computer readable storage in communication with the receiving digital device, or in the cloud.

The above-described functions and components can be comprised of instructions that are stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present invention. Therefore, these and other variations upon the exemplary embodiments are intended to be covered by the present invention(s).

The invention claimed is:

1. A system, comprising:
    a first transceiver module comprising:
        a modulator configured to receive a pretransmission signal and to modulate the pretransmission signal to generate a first complex signal;
        a first in-phase and quadrature (I/Q) module configured to receive the first complex signal and to transform the first complex signal into bit words of a predetermined size and framewords; and
        a first physical layer (PHY) device configured to receive the bit words of the predetermined size and framewords, to transmit the bit words and framewords over at least one cable, and to perform adaptive cancellation based, at least in part, on the transmitted bit words and framewords to improve reception over the at least one cable by the first PHY device; and
    a second transceiver module comprising:
        a second PHY device configured to receive the bit words and framewords from over the at least one cable;
        a second I/Q module configured to receive the bit words and framewords from the second PHY device of the second transceiver module and to transform the bit words to a second complex signal based, at least in part, on the framewords;
        an I/Q modulator configured to modulate the second complex signal to generate a transmit signal; and
        an antenna configured to transmit the transmit signal.

2. The system of claim 1, wherein the first transceiver module further comprises a phase lock loop configured to provide a clock signal to the I/Q modulator, the clock signal being at a speed that is slower than an operation of the first PHY device of the first transceiver module to allow for addition of the framewords by the first I/Q module of the first transceiver module.

3. The system of claim 1, wherein the predetermined size of the bit words is based on a largest size of bit words that the first PHY device of the first transceiver module may transmit over the at least one cable.

4. The system of claim 1, wherein the first complex signal is a 12 bit stream, and the first I/Q module configured to transform the first complex signal into the bit words of the predetermined size and framewords comprises the first I/Q module configured to transform the first complex signal to 8 bit words and framewords.

5. The system of claim 4, wherein the first I/Q module configured to transform the first complex signal into the bit words of the predetermined size and framewords comprises the first I/Q module configured to place 8 bits from an I component of the first complex signal into a first 8 bit word, to place 4 bits from the I component and 4 bits from a Q component of the first complex signal into a second 8 bit word, and to place 8 bits from the Q component into a third 8 bit word.

6. The system of claim 5, wherein the first I/Q module is further configured to add a frameword to the first 8 bit word and a frameword to the second 8 bit word.

7. The system of claim 1, wherein the at least one cable is a category five Ethernet cable.

8. The system of claim 1, wherein the second transceiver module further comprises:
    a waveguide filter configured to filter the transmit signal; and
    a waveguide module configured to provide the filtered transmit signal from the waveguide filter to the antenna.

9. The system of claim 1, wherein the first complex signal is a QAM signal.

10. The system of claim 1, wherein the first PHY device of the first transceiver module is further configured to initialize a connection with the second PHY device of the second transceiver module to determine an expectation of location of the framewords.

11. A system, comprising:
    a first transceiver module comprising:
        a first in-phase and quadrature (I/Q) module configured to receive a first complex signal, to place 8 bits from an I component of the first complex signal into a first 8 bit word, to place 4 bits from the I component and 4 bits from a Q component of the first complex signal into a second 8 bit word, and to place 8 bits from the Q component into a third 8 bit word to generate bit words of a predetermined size and framewords; and
        a first physical layer (PHY) device configured to receive the bit words of the predetermined size and framewords, to transmit the bit words and framewords over at least one cable, and to perform adaptive cancellation based, at least in part, on the transmitted bit words and framewords to improve reception over the at least one cable by the first PHY device; and
    a second transceiver module comprising:
        a second PHY device configured to receive the bit words and framewords from over the at least one cable;
        a second I/Q module configured to receive the bit words and framewords from the second PHY device of the second transceiver module and to transform the bit words to a second complex signal based, at least in part, on the framewords;
        a demodulator configured to demodulate the second complex signal; and
        a storage device configured to store data within a computer readable medium.

12. The system of claim 11, wherein the first transceiver module further comprises:
    an antenna configured to receive a receiver signal; and
    an I/Q demodulator configured to generate the first complex signal based on the receiver signal.

13. The system of claim 12, wherein the first transceiver module further comprises:
    a waveguide module configured to receive the receiver signal from the antenna; and
    a waveguide filter configured to filter the receiver signal from the waveguide module and provide the filtered receiver signal to the I/Q demodulator.

14. The system of claim 12, wherein the first transceiver module further comprises:
    a phase lock loop configured to provide a clock signal at a speed that is slower than an operation of the first PHY device of the first transceiver module to allow for addition of framewords by the first I/Q module of the first transceiver module; and an analog-to-digital converter configured to digitally convert the first complex signal based on the clock signal from the phase lock loop.

15. The system of claim 11, wherein the predetermined size of the bit words is based on a largest size of bit words that the first PHY device of the first transceiver module may transmit over the at least one cable.

16. The system of claim 11, wherein the first complex signal is a 12 bit stream.

17. The system of claim 11, wherein the at least one cable is a category five Ethernet cable.

18. A method comprising:
receiving a pretransmission signal and modulating the pretransmission signal to generate a first complex signal;
receiving the first complex signal;
transforming, by a first in-phase and quadrature (I/Q) module, the first complex signal into bit words of a predetermined size and frameworks;
transmitting, by a first physical layer (PHY) device, the bit words of the predetermined size and frameworks over at least one cable;
performing, by the first PHY device, adaptive cancellation based, at least in part, on the transmitted bit words and frameworks to improve reception over the at least one cable by the first PHY device;
receiving, by a second PHY device, the bit words and frameworks over the at least one cable;
transforming the bit words, by a second I/Q module, to a second complex signal based, at least in part, on the frameworks;
modulating, by an I/Q modulator, the second complex signal to generate a transmit signal; and
transmitting, by an antenna, the transmit signal.

19. The method of claim 18, further comprising generating, by a phase lock loop, a clock signal and controlling the modulation of the pretransmission signal based, at least in part, on the clock signal, the clock signal being at a speed that is slower than a transmission speed of the first PHY device to allow for addition of the frameworks.

20. The method of claim 18, wherein the predetermined size of the bit words is based on a largest size of bit words that the first PHY device may transmit over the at least one cable.

21. The method of claim 18, wherein the at least one cable is a category five Ethernet cable.

22. A method comprising:
receiving a first complex signal;
transforming, by a first in-phase and quadrature (I/Q) module, the first complex signal by placing 8 bits from an I component of the first complex signal into a first 8 bit word, placing 4 bits from the I component and 4 bits from a Q component of the first complex signal into a second 8 bit word, and placing 8 bits from the Q component into a third 8 bit word to generate bit words of a predetermined size and frameworks;
transmitting, by a first physical layer (PHY) device, the bit words of the predetermined size and frameworks over at least one cable;
performing, by the first PHY device, adaptive cancellation based, at least in part, on the transmitted bit words and frameworks to improve reception over the at least one cable by the first PHY device;
receiving, by a second PHY device, the bit words and frameworks over the at least one cable;
transforming the bit words, by a second I/Q module, to a second complex signal based, at least in part, on the frameworks;
demodulating, by a first I/Q demodulator, the second complex signal; and
storing, by a storage device, data within the demodulated second complex signal within a computer readable medium.

23. The method of claim 22, further comprising:
receiving, by an antenna, a receiver signal; and
generating, by a second I/Q demodulator, the first complex signal based on the receiver signal.

24. The method of claim 22, further comprising generating, by a phase lock loop, a clock signal and controlling the demodulation of the first I/Q demodulator based, at least in part, on the clock signal, the clock signal being at a speed that is slower than a transmission speed of the first PHY device to allow for of frameworks.

25. The method of claim 22, wherein the predetermined size of the bit words is based on a largest size of bit words that the first PHY device may transmit over the at least one cable.

26. The method of claim 22, wherein the at least one cable is a category five Ethernet cable.

27. A system, comprising:
a first transceiver module comprising:
a first in-phase and quadrature (I/Q) module configured to receive a first complex signal, to place 8 bits from an I component of the first complex signal into a first 8 bit word, to place 4 bits from the I component and 4 bits from a Q component of the first complex signal into a second 8 bit word, and to place 8 bits from the Q component into a third 8 bit word; and
a first physical layer (PHY) device configured to receive bit words of a predetermined size and frameworks, to transmit the bit words and frameworks over at least one cable, and to perform adaptive cancellation based, at least in part, on the transmitted bit words and frameworks to improve reception over the at least one cable by the first PHY device; and
a second transceiver module comprising:
a second PHY device configured to receive the bit words and frameworks from over the at least one cable;
a second I/Q module configured to receive the bit words and frameworks from the second PHY device of the second transceiver module and to transform the bit words to a second complex signal based, at least in part, on the frameworks;
an I/Q modulator configured to modulate the second complex signal to generate a transmit signal; and
an antenna configured to transmit the transmit signal.

28. The system of claim 27, wherein the first transceiver module further comprises a modulator configured to receive a pretransmission signal and to modulate the pretransmission signal to generate the first complex signal.

29. The system of claim 28, wherein the first transceiver module further comprises a phase lock loop configured to provide a clock signal to the modulator, the clock signal being at a speed that is slower than an operation of the first PHY device of the first transceiver module to allow for addition of the frameworks by the first I/Q module of the first transceiver module.

30. The system of claim 27, wherein the second transceiver module further comprises:
a waveguide filter configured to filter the transmit signal; and
a waveguide module configured to provide the filtered transmit signal from the waveguide filter to the antenna.

31. The system of claim 27, wherein the first PHY device of the first transceiver module is further configured to initialize a connection with the second PHY device of the second transceiver module to determine an expectation of location of the framewords.

* * * * *

UNITED STATES PATENT AND TRADEMARK OFFICE
CERTIFICATE OF CORRECTION

| | | |
|---|---|---|
| PATENT NO. | : 8,817,850 B2 | Page 1 of 1 |
| APPLICATION NO. | : 13/442808 | |
| DATED | : August 26, 2014 | |
| INVENTOR(S) | : Emerick Vann | |

It is certified that error appears in the above-identified patent and that said Letters Patent is hereby corrected as shown below:

In the Claims

Clam 24, column 20, line 15:
"allow for of framewords" should read -- allow for addition of framewords --.

Signed and Sealed this
Thirtieth Day of June, 2015

Michelle K. Lee
*Director of the United States Patent and Trademark Office*